United States Patent
Shin et al.

(10) Patent No.: US 9,684,105 B2
(45) Date of Patent: Jun. 20, 2017

(54) POLARIZING PLATE, LIQUID CRYSTAL DISPLAY COMPRISING THE SAME AND METHOD FOR PREPARING POLARIZING PLATE

(71) Applicant: SAMSUNG SDI CO., LTD., Yongin-si, Gyeonggi-do (KR)

(72) Inventors: Kwang Ho Shin, Uiwang-si (KR); Eun Su Park, Uiwang-si (KR); Dong Yoon Shin, Uiwang-si (KR); Hae Ryong Chung, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 14/804,313

(22) Filed: Jul. 20, 2015

(65) Prior Publication Data

US 2016/0018564 A1    Jan. 21, 2016

(30) Foreign Application Priority Data

Jul. 21, 2014 (KR) .......................... 10-2014-0092199

(51) Int. Cl.
*G02B 1/08* (2006.01)
*G02B 5/30* (2006.01)
(Continued)

(52) U.S. Cl.
CPC ............ *G02B 5/3083* (2013.01); *G02B 1/04* (2013.01); *G02F 1/133528* (2013.01)

(58) Field of Classification Search
CPC .......... G02B 1/08; G02B 5/3083; G02B 5/32; G02F 1/133528
(Continued)

(56) References Cited

U.S. PATENT DOCUMENTS 9,493,684 B2 * 11/2016 Saitou .................... C09J 7/0217
2005/0133035 A1 * 6/2005 Yahiaoui ............ A41D 13/1184
128/206.19
(Continued)

FOREIGN PATENT DOCUMENTS

JP         58-091408 A  *  5/1983  ............... G02B 5/30
JP      2001-239579 A  *  9/2001  ............. B29C 55/12
(Continued)

OTHER PUBLICATIONS

Korean Office action dated Jul. 19, 2016, corresponding to Korean Patent Application No. 10-2014-0092199 (5 pages).

*Primary Examiner* — Frank Font
(74) *Attorney, Agent, or Firm* — Lewis Roca Rothgerber Christie LLP

(57) ABSTRACT

A polarizing plate includes a polarizer and a polyester film formed on at least one surface of the polarizer. The polyester film includes a polyester base film and a primer layer formed on at least one surface of the polyester base film. The polyester film contains about 0.1 wt % to about 5 wt % of a UV absorbent. In addition, a liquid crystal display includes the polarizing plate. A method of fabricating a polarizing plate includes preparing a multilayer film containing about 0.1 wt % to about 5 wt % of a UV absorbent, stretching the multilayer film to about 2 to about 10 times its initial length in a transverse direction (TD) to prepare a polyester film, and attaching the polyester film to at least one surface of a polarizer. The multilayer film comprises a polyester base film and a primer layer on at least one surface of the polyester base film.

16 Claims, 1 Drawing Sheet

(51) Int. Cl.
*G02F 1/1335* (2006.01)
*G02B 1/04* (2006.01)

(58) Field of Classification Search
USPC ............ 359/483.01, 487.01, 489.01, 489.07, 359/489.11
See application file for complete search history.

(56) References Cited

U.S. PATENT DOCUMENTS

| | | | | |
|---|---|---|---|---|
| 2007/0184212 | A1* | 8/2007 | Nimura | G02B 5/3033 428/1.31 |
| 2009/0033839 | A1* | 2/2009 | Fukuda | C09K 19/348 349/102 |
| 2015/0015830 | A1* | 1/2015 | Kim | G02F 1/133528 349/96 |
| 2016/0238771 | A1* | 8/2016 | Lee | G02B 5/3033 |

FOREIGN PATENT DOCUMENTS

| | | | |
|---|---|---|---|
| JP | 2007-094396 A | 4/2007 | |
| KR | 10-2007-0065336 A | 6/2007 | |
| KR | 10-2014-0080421 A | 6/2014 | |
| WO | WO 2009/091154 A2 * | 7/2009 | ............... G02B 5/02 |

* cited by examiner

POLARIZING PLATE, LIQUID CRYSTAL DISPLAY COMPRISING THE SAME AND METHOD FOR PREPARING POLARIZING PLATE

CROSS-REFERENCE TO RELATED APPLICATION

This application claims priority to and the benefit of Korean Patent Application No. 10-2014-0092199, filed on Jul. 21, 2014 in the Korean Intellectual Property Office, the entire content of which is incorporated herein by reference.

BACKGROUND

1. Technical Field

Embodiments of the present invention relate to a polarizing plate, a liquid crystal display including the same, and a method of fabricating a polarizing plate.

2. Description of the Related Art

A polarizing plate includes a polarizer and a protective film formed on at least one surface of the polarizer for protecting the polarizer. Although, triacetyl cellulose (TAC) films are typically used as the protective films, TAC films are more expensive than general polymer films. Instead of TAC films, low-priced polymer films, such as polyester films (including polyethylene terephthalate (PET) films) and (meth)acrylate films (including polymethyl methacrylate (PMMA)) films have been used. Since the liquid crystals of a liquid crystal display are prone to destruction by UV light, the PET film contains a UV absorbent to protect the liquid crystals. However, the UV absorbent generally has poor compatibility with polyethylene terephthalate. The PET film used in polarizing plates is stretched to a high elongation to prevent the generation of rainbow spots, and can suffer from variations in retardation and/or haze and/or transmittance due to migration of the UV absorbent when stretched to such high elongation or used in the polarizing plate, thereby causing deterioration in image quality.

SUMMARY

According to embodiments of the present invention, a polarizing plate includes a polyester film having a low variation rate in retardation and/or haze and/or transmittance during fabrication or in use.

In accordance with embodiments of the present invention, a polarizing plate includes a polarizer and a polyester film formed on at least one surface of the polarizer. The polyester film includes a polyester base film and a primer layer formed on at least one surface of the polyester base film. The polyester film contains about 0.1% by weight (wt %) to about 5 wt % of a UV absorbent.

In accordance with embodiments of the present invention, a liquid crystal display may include the polarizing plate as set forth herein.

In accordance with embodiments of the present invention, a method of fabricating a polarizing plate includes: preparing a multilayer film containing about 0.1 wt % to about 5 wt % of a UV absorbent; stretching the multilayer film to about 2 to about 10 times its initial length in a transverse direction (TD) to prepare a polyester film; and attaching the polyester film to at least one surface of a polarizer. The multilayer film includes a polyester base film and a primer layer formed on at least one surface of the polyester base film.

DETAILED DESCRIPTION

Figure 1:
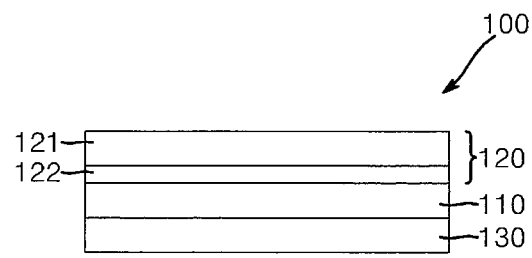
FIG. 1 is a schematic cross-sectional view of a polarizing plate according to embodiments of the present invention.

Embodiments of the present invention will be described with reference to the accompanying drawings. It should be understood that the described embodiments of the present invention may be embodied in different ways and are not limited to the following descriptions. In the drawings, portions irrelevant to the description are omitted for clarity. Like components are denoted by like reference numerals throughout the specification. As used herein, directional terms such as "upper" and "lower" are defined with reference to the accompanying drawings. Thus, it will be understood that the term "upper surface" can be used interchangeably with the term "lower surface".

A polarizing plate according to embodiments of the present invention includes a polarizer and a polyester film formed on at least one surface of the polarizer. The polyester film includes a polyester base film and a primer layer formed on at least one surface of the polyester base film. The polyester film contains about 0.1 wt % to about 5 wt %, for example, about 0.15 wt % to about 5 wt %, for example, about 0.2 wt % to about 5 wt % of a UV absorbent. When the UV absorbent is present in an amount within these ranges, the polyester film can have UV-blocking capabilities and can prevent (or reduce) the generation of rainbow spots. Further, when the polyester film is used in a polarizing plate, migration of the UV absorbent can be suppressed, thereby reducing the variation rate in retardation and/or haze and/or transmittance of the polyester film after evaluation of reliability. In addition, even though the polyester film may be stretched to a high elongation during fabrication, migration of the UV absorbent is prevented (or reduced).

For example, the polyester film may have a rate of variation (or variation rate) in retardation of about 0% to about 5%, for example, about 0.5% to about 5%, as calculated using Equation 1. Also, the polyester film may have a variation rate in haze of about 0% to about 5%, for example, about 1% to about 5%, as calculated using Equation 2. Additionally, the polyester film may have a variation rate in transmittance of about 0% to about 5%, for example, about 1% to about 5%, for example, about 1% to about 4.5%, as calculated using Equation 3. Within these ranges, it is possible to achieve stable optical properties.

$$\text{Variation rate of retardation} = |B-A|/A \times 100 \qquad (1)$$

In Equation 1, A is the initial retardation at a wavelength of 550 nm of the polyester film, and B is the retardation at a wavelength of 550 nm of the polyester film after being left at 85° C. for 1000 hours or at 60° C./RH 95% for 1000 hours.

$$\text{Variation rate of haze} = |D-C|/C \times 100 \qquad (2)$$

In Equation 2, C is the initial haze (unit: %) at a wavelength of 550 nm of the polyester film, and D is the haze (unit: %) at a wavelength of 550 nm of the polyester film after being left at 85° C. for 1000 hours.

$$\text{Variation rate of transmittance} = |F-E|/E \times 100 \qquad (3)$$

In Equation 3, E is the initial transmittance (unit: %) at a wavelength of 370 nm of the polyester film, and F is a transmittance (unit: %) at a wavelength of 370 nm of the polyester film after being subjected to UV irradiation at 120 W·sec/m² for 1000 hours.

In some embodiments, the polyester film may have a variation rate in retardation of about 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5.0%, as calculated using Equation 1. Further, the polyester film may have a variation rate in retardation (as calculated using Equation 1) ranging from any one of these numerical values to any other of these numerical values.

In some embodiments, the polyester film may have a variation rate in haze of about 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5.0%, as calculated using Equation 2. Further, the polyester film may have a variation rate in haze (as calculated using Equation 2) ranging from any one of these numerical values to any other of these numerical values.

In some embodiments, the polyester film may have a variation rate in transmittance of about 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5.0%, as calculated using Equation 3. Further, the polyester film may have a variation rate in transmittance (as calculated using Equation 3) ranging from any one of these numerical values to any other of these numerical values.

In Equation 1, the term "retardation" may refer to in-plane retardation (Ro, unit: nm), thickness direction retardation (Rth, unit: nm), or the degree of biaxiality (NZ) at a wavelength of 550 nm of the polyester film.

Further, to obtain a polyester film having ultra-high retardation, the polyester film may be prepared by stretching a film obtained by melt extruding a mixture of a polyester film resin and a UV absorbent only in the TD (without MD stretching), followed by coating a primer layer on one or both surfaces of the film, and then stretching the film to high elongation. When the UV absorbent is contained in the polyester film in the amount set forth above, the polyester film can exhibit reduced variation rate in retardation and/or haze and/or transmittance after evaluation of reliability while having ultra-high retardation.

In some embodiments, the UV absorbent may be contained in at least one of the polyester base film and/or the primer layer. In addition, an optical film may further be formed on at least one surface of the polarizer to protect the polarizer.

Hereinafter, a polarizing plate according to embodiments of the invention will be described with reference to FIG. 1. Referring to FIG. 1, a polarizing plate 100 according to embodiments of the present invention includes a polarizer 110, a polyester film 120 formed on an upper surface of the polarizer 110, and an optical film 130 formed on a lower surface of the polarizer 110. The polyester film 120 includes a polyester base film 121 containing a UV absorbent (not shown in FIG. 1) and a primer layer 122 formed on a lower surface of the polyester base film 121. The UV absorbent is present in the polyester film 120 in an amount of about 0.1 wt % to about 5 wt %. In some embodiments, the UV absorbent may be present in the polyester film 120 in an amount of about 0.1 wt %, 0.2 wt %, 0.3 wt %, 0.4 wt %, 0.5 wt %, 0.6 wt %, 0.7 wt %, wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, or 5.0 wt %. Further, the UV absorbent may be present in the polyester film 120 in an amount ranging from any one of these numerical values to any other of these numerical values.

The polarizer 110 has a specific direction of molecular alignment. When mounted on a liquid crystal display, the polarizer allows transmission of light travelling in a specific direction therethrough. The polarizer may be fabricated by dyeing a polyvinyl alcohol film with iodine or a dichroic dye, followed by stretching the polyvinyl alcohol film in a specific direction. Specifically, the polarizer may be fabricated by swelling, dyeing, stretching, and crosslinking. Methods of performing these processes are generally known to those skilled in the art.

The polarizer 110 may have a thickness of about 5 μm to about 30 μm. Within this range, the polarizer can be used in a polarizing plate for liquid crystal displays.

The polyester film 120 may be formed on the upper surface of the polarizer, and protects the liquid crystals from UV light when used in a liquid crystal display.

The polyester film 120 may be a highly stretched film and may have ultra-high retardation, which enables the polyester film to suppress (or reduce) the generation of rainbow spots when the polarizing plate is mounted on a liquid crystal display, thereby preventing (or reducing) deterioration in image quality. For example, the polyester film 120 may have a thickness of about 25 μm to about 115 μm and an in-plane retardation (Ro) at a wavelength of 550 nm of about 5,000 nm to about 15,000 nm, for example, about 10,100 nm to about 12,000 nm. Within these ranges, when used as a protective film of the polarizer, the polyester film can prevent (or reduce) the generation of rainbow spots. In addition, the polyester film can suppress (or reduce) light leakage at the lateral sides of the polarizing plate, and prevent (or reduce) increases in the difference between retardation values by preventing variations in the retardation values depending upon the incident angle.

In some embodiments, the polyester film 120 may have an in-plane retardation (Ro) at a wavelength of 550 nm of about 5000 nm, 5100 nm, 5200 nm, 5300 nm, 5400 nm, 5500 nm, 5600 nm, 5700 nm, 5800 nm, 5900 nm, 6000 nm, 6100 nm, 6200 nm, 6300 nm, 6400 nm, 6500 nm, 6600 nm, 6700 nm, 6800 nm, 6900 nm, 7000 nm, 7100 nm, 7200 nm, 7300 nm, 7400 nm, 7500 nm, nm 7600 nm, 7700 nm, 7800 nm, 7900 nm, 8000 nm, 8100 nm, 8200 nm, 8300 nm, 8400 nm, 8500 nm, 8600 nm, 8700 nm, 8800 nm, 9900 nm, 9000 nm, 9100 nm, 9200 nm, 9300 nm, 9400 nm, 9500 nm, 9600 nm, 9700 nm, 9800 nm, 9900 nm, 10000 nm, 10100 nm, 10200 nm, 10300 nm, 10400 nm, 10500 nm, 10600 nm, 10700 nm, 10800 nm, 10900 nm, 11000 nm, 11100 nm, 11200 nm, 11300 nm, 11400 nm, 11500 nm, 11600 nm, 11700 nm, 11800 nm, 11900 nm, 12000 nm, 12100 nm, 12200 nm, 12300 nm, 12400 nm, 12500 nm, 12600 nm, 12700 nm, 12800 nm, 12900 nm, 13000 nm, 13100 nm, 13200 nm, 13300 nm, 13400 nm, 13500 nm, 13600 nm, 13700 nm, 13800 nm, 13900 nm, 14000 nm, 14100 nm, 14200 nm, 14300 nm, 14400 nm, 14500 nm, 14600 nm, 14700 nm, 14800 nm, 14900 nm, or 15000 nm. Further, the polyester film 120 may have an in-plane retardation (Ro) at a wavelength of 550 nm ranging from any one of these numerical values to any other of these numerical values.

The polyester film 120 may have a degree of biaxiality (NZ) at a wavelength of 550 nm of about 1.8 or less, for example, about 1.0 to about 1.8, as calculated using Equation 4. Within these ranges, the polyester film can suppress (or reduce) the generation of spots due to birefringence.

$$NZ=(nx-nz)/(nx-ny) \quad (4)$$

In Equation 4, nx, ny and nz are the indices of refraction at a wavelength of 550 nm in the x-, y- and z-axis directions, respectively, of the polyester film.

The polyester film 120 may have a thickness direction retardation (Rth) at a wavelength of 550 nm of about 15,000 nm or less, for example, about 10,000 nm to about 13,000 nm, as calculated by Equation 5. Within these ranges, the polyester film can suppress (or reduce) the generation of spots due to birefringence.

$$Rth=((nx+ny)/2-nz) \times d \quad (5)$$

In Equation 5, nx, ny and nz are the indices of refraction at a wavelength of 550 nm in the x-, y- and z-axis directions, respectively, of the polyester film, and d is the thickness (unit: nm) of the polyester film.

The x-axis, the y-axis, and the z-axis refer to the machine direction (MD), the transverse direction (TD), and the thickness direction of the polyester film, respectively.

The polyester film tends to crystallize upon stretching, and thus can cause rainbow spots when used in a polarizing plate, which results in deteriorations in image quality. When both nx (which is the index of refraction at a wavelength of 550 nm in the x-axis direction of the polyester film) and ny (which is the index of refraction at a wavelength of 550 nm in the y-axis direction of the polyester film) are less than about 1.65, or both nx and ny are about 1.65 or more, the polyester film can cause the generation of rainbow spots due to birefringence resulting from a change in retardation depending upon the angle of incidence and the wavelength of light when used as a protective film. Thus, in the polyester film 120, at least one of nx and ny is about 1.65 or greater. In some embodiments, the polyester film may have an index of refraction in the x-axis direction (nx) of about 1.65 or greater, for example, about 1.67 to about 1.75, and an index of refraction in the y-axis direction (ny) of less than about 1.65, for example, about 1.45 to about 1.60. In some embodiments, the polyester film may have an index of refraction in the y-axis direction (ny) of about 1.65 or greater, for example, about 1.67 to about 1.75, or about 1.67 to about 1.72, and an index of refraction in the x-axis direction (nx) of less than about 1.65, for example, about 1.45 to about 1.55. When an absolute value (|nx−ny|) of the difference between nx and ny is about 0.1 to about 0.2, for example, about 0.1 to about 0.18, the viewing angle may be further enhanced while also preventing (or reducing) the generation of rainbow spots. In some embodiments, the absolute value (|nx−ny|) of the difference between nx and ny may be about 0.10, 0.11, 0.12, 0.13, 0.14, 0.15, 0.16, 0.17, 0.18, 0.19, or 0.20. Further, the absolute value (|nx−ny|) of the difference between nx and ny may range from any one of these numerical values to any other of these numerical values.

The polyester film 120 may achieve an index of refraction of about 1.67 to about 1.75 by including about 0.1 wt % to about 5 wt % of the UV absorbent. Within this range, the polyester film can provide optimum image quality and protect the liquid crystal cell. In some embodiments, the polyester film 120 may have an index of refraction of about 1.67, 1.68, 1.69, 1.70, 1.71, 1.72, 1.73, 1.74, or 1.75. Further, the polyester film 120 may have an index of refraction ranging from any one of these numerical values to any other of these numerical values.

The polyester base film 121 serves to support the polyester film and may have a retardation value in a specified range to prevent (or reduce) the generation of rainbow spots. The polyester base film may have an index of refraction of about 1.67 to about 1.75, and may be formed of a composition including a polyester resin and the UV absorbent. For example, the polyester resin may include at least one of polyethylene terephthalate, polybutylene terephthalate, polyethylene naphthalate, and/or polybutylene naphthalate resins.

The polyester base film 121 may have a thickness of about 10 μm to about 115 μm. Within this range, the polyester base film can be used in liquid crystal displays.

The polyester film may have a hydrophobic surface, and polyethylene terephthalate films exhibit high hydrophobicity. Thus, in order to provide good adhesion of the polyester film to the polarizer, surface modification of the polyester film using the primer layer 122 converts the hydrophobic surface into a hydrophilic surface.

The primer layer 122 is formed by coating a composition including a primer layer resin containing both hydrophilic and hydrophobic groups. For example, the primer layer resin may include polyester resins, polyvinylacetate resins, or a combination thereof, but is not limited thereto.

The primer layer 122 may have a thickness of about 1 nm to about 200 nm. Within this range, the primer layer can provide good adhesion and high total luminous transmittance. Although the primer layer 122 is shown as being formed only on the lower surface of the polyester base film 121 in FIG. 1, it is understood that the primer layer may be formed on both surfaces of the polyester base film, or may be formed only on the upper surface of the polyester base film.

The UV absorbent is contained in the polyester film to protect the liquid crystals. The UV absorbent may have an index of refraction of about 1.5 to about 1.7 such that the difference between the index of refraction of the UV absorbent and the index of refraction of the polyester base film (i.e., the index of refraction of the polyester base film−the index of refraction of the UV absorbent) may be about 0.01 to about 0.1. Within this range, it is possible to block UV light having a wavelength of about 380 nm or less, and minimize retardation interference.

The UV absorbent may include any suitable UV absorbent capable of absorbing light having a wavelength of about 200 nm to about 400 nm. For example, the UV absorbent may include at least one selected from phenol (for example TINUVIN 326), benzotriazole, salicylic acid, benzophenone, triazine, and oxamide UV absorbents. For example, phenol UV absorbents are highly compatible with the polyester resin, and thus mix well with the polyester resin, thereby avoiding (or reducing) elution from the polyester film and suppressing (or reducing) the generation of holes on the surface of, or inside the film, thereby improving the appearance of the film.

The optical film 130 may be formed on one surface of a liquid crystal display panel and has a retardation value in a specified range to compensate for viewing angle. In some embodiments, the optical film may have an in-plane retardation Ro at a wavelength of 550 nm of about 40 nm to about 60 nm. Within this range, the optical film can provide optimum image quality. The optical film 130 may have a thickness of about 25 µm to about 500 µm, for example, about 25 µm to about 50 µm. Within these ranges, the optical film can be used in a polarizing plate for a liquid crystal display.

The optical film 130 may be a transparent optical film and may be formed of at least one of a cellulose (including triacetyl cellulose and the like), a polyester (including polyethylene terephthalate, polybutylene terephthalate, polyethylene naphthalate, polybutylene naphthalate and the like), a cyclic polyolefin, a polycarbonate, a polyethersulfone, a polysulfone, a polyamide, a polyimide, a polyolefin, a polyarylate, a polyvinyl alcohol, a polyvinyl chloride, and/or a polyvinylidene chloride resin. For example, the optical film may be a non-polyester film formed of at least one of a cellulose, a cyclic polyolefin, a polycarbonate, a polyethersulfone, a polysulfone, a polyamide, a polyimide, a polyolefin, a polyarylate, a polyvinyl alcohol, a polyvinyl chloride, and/or a polyvinylidene chloride resin.

Although not shown in FIG. 1, an adhesive layer may be formed between the polarizer 110 and the polyester film 120, or between the polarizer 110 and the optical film 130 to increase the mechanical strength of the polarizing plate. The adhesive layer may include at least one suitable adhesive, for example, a water-based adhesive, pressure-sensitive adhesive, and/or photocurable adhesive.

Further, although not shown in FIG. 1, an adhesive layer may be further formed on a lower surface of the optical film 130 to stack the polarizing plate on the liquid crystal display panel. The adhesive layer may include a pressure-sensitive adhesive, but is not limited thereto.

The polarizing plate 100 may have a thickness of about 25 µm to about 500 µm. Within this range, the polarizing plate can be used as a polarizing plate for a liquid crystal display.

The polarizing plate may have a degree of polarization of about 99.99% or greater, for example, about 99.99% to about 99.999%, and a transmittance at a wavelength of about 400 nm to about 750 nm of about 40% or greater, for example, about 40% to about 80%. Within these ranges, the polarizing plate does not exhibit (or exhibits a reduced amount of) deteriorated optical characteristics when mounted on a liquid crystal display.

Although not shown in FIG. 1, the polyester film 120 may include a functional coating layer formed on its upper surface, for example, a hard coating layer, an anti-reflection layer, and/or an anti-fingerprint layer. The functional coating layer may have a thickness of about 1 µm to about 10 µm. Within this thickness range for the functional layer, the polyester film can be applied to the polarizing plate when stacked on the polarizer.

In addition, although not shown in FIG. 1, the UV absorbent may also be present in the primer layer 122. The UV absorbent may be present in the primer layer 122 in an amount of about 0.1 wt % to about 5 wt %. In some embodiments, the UV absorbent may be present in the primer layer 122 an amount of about 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, or 5.0 wt %. Further, the UV absorbent may be present in the primer layer 122 in an amount ranging from any one of these numerical values to any other of these numerical values.

Figure 2:
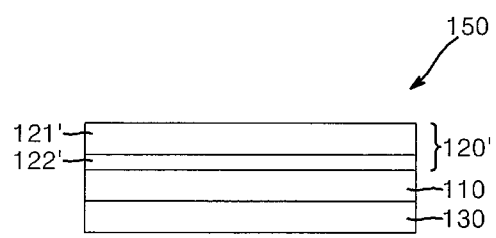
FIG. 2 is a schematic cross-sectional view of a polarizing plate according to embodiments of the present invention.

Next, a polarizing plate according to embodiments of the present invention will be described with reference to FIG. 2. Referring to FIG. 2, a polarizing plate 150 according to embodiments of the present invention may include a polarizer 110, a polyester film 120' formed on an upper surface of the polarizer 110, and an optical film 130 formed on a lower surface of the polarizer 110. The polyester film 120' may include a polyester base film 121' and a primer layer 122' formed on a lower surface of the polyester base film 121' and containing a UV absorbent (not shown in FIG. 2). The UV absorbent may be present in the polyester film 120' in an amount of about 0.1 wt % to about 5 wt %. The polarizing plate depicted in FIG. 2 is substantially the same as the polarizing plate described above with respect to FIG. 1, except that the UV absorbent is contained in the primer layer instead of the polyester base film.

A method of fabricating a polarizing plate according to embodiments of the invention includes preparing a polyester base film containing a UV absorbent by melt extruding a mixture of the UV absorbent and a polyester resin, forming a primer layer on one or both surfaces of the polyester base film, stretching the polyester base film with the primer layer to about 2 to about 10 times its initial length only in the transverse direction (TD) to prepare a polyester film, and attaching the polyester film to one or both surfaces of a polarizer.

The UV absorbent may be present in an amount of about 0.1 parts by weight to about 5 parts by weight based on 100 parts by weight of the polyester resin. Within this range, the polyester film can be prepared containing the UV absorbent.

Within this TD elongation range, the polyester film has ultra-high retardation and can thus prevent (or reduce) the generation of rainbow spots when used in a liquid crystal display, while also avoiding (or reducing the occurrence of) fractures due to deteriorations in the physical properties of the film, and tearing during stretching. In some embodiments, the polyester film has a TD elongation of about 3 to about 9 times the initial length, for example, about 4 to about 8 times the initial length. Within these ranges, the polyester film can be prepared with ultra-high retardation.

Stretching may be performed by at least one of dry stretching and/or wet stretching, and the stretching temperature may range from about (Tg−20°) C. to about (Tg+50°) C., where Tg is the glass transition temperature of the polyester resin. For example, the stretching temperature may be about 70° C. to about 150° C., for example, about 80° C. to about 130° C., or about 90° C. to about 120° C. Within these ranges, the polyester film can be prepared with ultra-high retardation.

The method may further include, before attaching the stretched polyester film to the polarizer, performing tension-relaxation at a specified temperature range to anneal the polyester film. By performing tension-relaxation, it is possible to crystallize and stabilize the polyester film through heat treatment while stretching the polyester film in the transverse direction. In some embodiments, in performing the tension-relaxation, the polyester film may be heated in an oven at about 100° C. to about 300° C. for about 1 second to about 2 hours, and may have a TD elongation of greater than about 0 and less than or equal to about 3 times the initial length, for example about 0.1 to about 2 times the initial length, or about 0.1 to about 1 times the initial length.

The polyester film may be obtained by the method of fabricating a polyester film as set forth above.

The polarizer may be fabricated by dyeing a polyvinyl alcohol film with iodine or a dichroic dye, followed by stretching the polyvinyl alcohol film in a specific direction. Methods of performing these processes are generally known to those skilled in the art.

The polyester film may be attached to the polarizer by any suitable method. For this purpose, an adhesive may be used, such as at least one of a water-based adhesive, a pressure-sensitive adhesive, and/or a photocurable adhesive.

The method of fabricating a polarizing plate may further include attaching an optical film to the other surface of the polarizer. For this purpose, an adhesive may be used, such as at least one of a water-based adhesive, a pressure-sensitive adhesive, and a photocurable adhesive may be used.

A method of fabricating a polarizing plate according to embodiments of the invention includes preparing a polyester base film by melt extruding a mixture of a polyester resin, forming a primer layer containing a UV absorbent on one or both surfaces of the polyester base film, stretching the polyester base film with the primer layer to about 2 to about 10 times its initial length only in the transverse direction (TD) to prepare a polyester film, and attaching the polyester film to one or both surfaces of a polarizer. This method is substantially the same as the method described above, except that the UV absorbent is contained in the primer layer instead of the polyester base film.

The primer layer containing the UV absorbent may be formed of a composition including the UV absorbent and a primer layer resin, and the UV absorbent may be present in an amount of about 0.1 parts by weight to about 5 parts by weight based on 100 parts by weight of the polyester base film. Within this range, the polyester film may be prepared to contain the UV absorbent.

The polyester film may be obtained by the method of fabricating a polyester film as set forth above.

Figure 3:
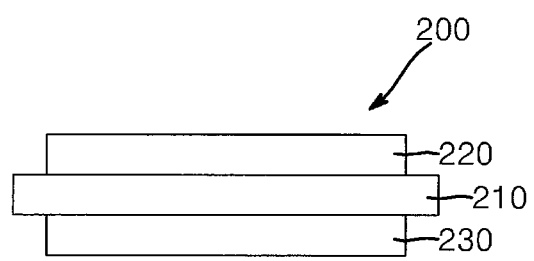
FIG. 3 is a schematic cross-sectional view of a liquid crystal display module according to embodiments of the present invention.

A liquid crystal display according to embodiments of the present invention may include a liquid crystal display module including the polarizing plate according to embodiments of the present invention. FIG. 3 is a schematic cross-sectional view of a liquid crystal display module according to embodiments of the present invention. Referring to FIG. 3, a liquid crystal display module 200 includes a liquid crystal display panel 210, a first polarizing plate 220 formed on an upper surface of the liquid crystal display panel 210, and a second polarizing plate 230 formed on a lower surface of the liquid crystal display panel 210. The first polarizing plate 220 may include the polarizing plate according to embodiments of the present invention.

Each of the first polarizing plate 220 and the second polarizing plate 230 may be formed on one surface of the liquid crystal display panel via an adhesive layer. Any suitable adhesive can be used as the adhesive layer, for example, a pressure-sensitive adhesive may be used.

Although FIG. 3 shows the second polarizing plate 230 as not the polarizing plate according to embodiments of the present invention, it should be understood that the second polarizing plate may also be a polarizing plate according to embodiments of the present invention.

Next, embodiments of the present invention will be described with reference to some examples. However, it should be noted that these examples are provided for illustration only and are not to be construed in any way as limiting the embodiments of the present invention.

The components used in the Examples and Comparative Examples were as follows:

(1) Material for polarizer: Polyvinyl alcohol film (VF-PS6000, thickness: 60 µm, Kuraray Co., Ltd., Japan)

(2) Polyethylene terephthalate film: Polyethylene terephthalate films as listed in Table 1.

(3) Optical film: Triacetyl cellulose film (KC4DR-1, thickness: 40 µm, Konica, Japan).

Examples 1 to 3

A polyvinyl alcohol film was stretched to an elongation of 3 times the initial length at 60° C., followed by adsorption with iodine and stretching to an elongation of 2.5 times the initial length in an aqueous solution of boric acid at 40° C., thereby preparing a polarizer. A polyethylene terephthalate film containing a UV absorbent as listed in Table 1 was attached to one surface of the polarizer using an adhesive (Z-200, Nippon Goshei Co., Ltd.), and an optical film was attached to the other surface of the polarizer using an adhesive (Z-200, Nippon Goshei Co., Ltd.), thereby fabricating a polarizing plate.

The polyethylene terephthalate film listed in Table 1 was prepared by melt extruding a mixture of a polyethylene terephthalate resin and a UV absorbent (TINUVIN 326, BASF Co., Ltd) to form a base film, forming a primer layer of a polyester resin on both surfaces of the prepared base film, stretching the film with the primer layer to an elongation of 6.1 times the initial length only in the TD (without MD stretching), and performing tension-relaxation at 150° C. to anneal the film. The polyethylene terephthalate film of Table 1 had a thickness of 80 µm, and Ro, Rth, NZ, nx, and ny at a wavelength of 550 nm were measured using a retardation tester (AxoScan, Axometrics Co., Ltd.).

Example 4

A polyvinyl alcohol film was stretched to an elongation of 3 times the initial length at 60° C., followed by adsorption with iodine and stretching to an elongation of 2.5 times the initial length in an aqueous solution of boric acid at 40° C., thereby preparing a polarizer. A polyethylene terephthalate film including a UV absorbent as listed in Table 1 was attached to one surface of the polarizer using an adhesive (Z-200, Nippon Goshei Co., Ltd.), and an optical film was attached to the other surface of the polarizer using an adhesive (Z-200, Nippon Goshei Co., Ltd.), thereby fabricating a polarizing plate.

The polyethylene terephthalate film listed in Table 1 was prepared by melt extruding a polyethylene terephthalate resin to form a base film, forming a primer layer including a polyester resin and a UV absorbent (TINUVIN 326, BASF Co., Ltd) on both surfaces of the prepared base film, stretching the film with the primer layer to an elongation of 6.1 times the initial length only in the TD (without MD stretching), and performing tension-relaxation at 150° C. to anneal the film. The polyethylene terephthalate film listed in Table 1 had a thickness of 80 µm, and Ro, Rth, NZ, nx, and ny at a wavelength of 550 nm were measured using a retardation tester (AxoScan, Axometrics Co., Ltd).

Comparative Examples 1 to 3

Polarizing plates were fabricated as in Example 1, except that the polyethylene terephthalate films listed in Table 1 were used.

TABLE 1

| | Content of UV absorbent in polyethylene terephthalate film (wt %) | Ro (nm) | Rth (nm) | NZ | nx | ny |
|---|---|---|---|---|---|---|
| Example 1 | 0.5 | 10800 | 12100 | 1.62 | 1.68 | 1.58 |
| Example 2 | 3.0 | 10800 | 12100 | 1.62 | 1.68 | 1.58 |
| Example 3 | 5.0 | 10800 | 12100 | 1.62 | 1.68 | 1.58 |
| Example 4 | 0.5 | 10800 | 12100 | 1.62 | 1.68 | 1.58 |
| Comp. Example 1 | 0.05 | 400 | 540 | 1.83 | 1.60 | 1.59 |
| Comp. Example 2 | 7.0 | 10800 | 12100 | 1.62 | 1.68 | 1.58 |
| Comp. Example 3 | 10.0 | 4800 | 5800 | 1.62 | 1.64 | 1.59 |

The following properties of the polarizing plates and polyethylene terephthalate films of the Examples and Comparative Examples were evaluated. The evaluation results are shown in Table 2.

TABLE 2

| | Generation of rainbow spot | UV blocking capability | In-plane retardation (Ro) | | | Haze | | | Transmittance | | |
|---|---|---|---|---|---|---|---|---|---|---|---|
| | | | Initial value (nm) | Value after reliability (nm) | Variation rate (%) | Initial value (%) | Value after reliability (%) | Variation rate (%) | Initial value (%) | Value after reliability (%) | Variation rate (%) |
| Ex. 1 | x | ○ | 10800 | 10692 | 1.0 | 0.75 | 0.76 | 1.3 | 1.74 | 1.7 | 2.3 |
| Ex. 2 | x | ○ | 10800 | 10476 | 3.0 | 0.92 | 0.94 | 2.2 | 0.62 | 0.6 | 3.3 |
| Ex. 3 | x | ○ | 10800 | 10260 | 5.0 | 1.21 | 1.24 | 2.5 | 0.31 | 0.3 | 3.3 |
| Ex. 4 | x | ○ | 10800 | 10750 | 0.5 | 0.81 | 0.82 | 1.2 | 1.76 | 1.84 | 4.5 |
| Comp. Ex. 1 | ○ | x | 400 | 398 | 0.5 | 0.70 | 0.71 | 1.4 | 13.0 | 12.4 | 4.6 |
| Comp. Ex. 2 | x | ○ | 10800 | 9612 | 11.0 | 3.7 | 3.89 | 5.1 | 0.11 | 0.1 | 9.1 |
| Comp. Ex. 3 | ○ | ○ | 4800 | 3696 | 23.0 | 4.2 | 4.42 | 5.2 | 0.11 | 0.1 | 9.1 |

As shown in Table 2, the polarizing plates according to embodiments of the present invention exhibited good liquid crystal UV shielding capability, did not suffer from rainbow spots, and exhibited low variation rates in each of in-plane retardation, haze, and transmittance.

On the contrary, the polarizing plate of Comparative Example 1 (containing the UV absorbent in an amount less than 0.1 wt %) exhibited deteriorated capability of blocking light in the UV region, and the polarizing plates of Comparative Examples 2 and 3 (containing the UV absorbent in an amount greater than 5 wt %) exhibited deteriorated image quality and commercialization due to high levels of haze and manufacturing cost.

The properties reported in Table 2 were evaluated according to the following procedures.

(1) Occurrence of rainbow spot: Polarizing plates were placed on an upper surface of a VA mode LCD panel, on a lower surface of the LCD panel, and between the LCD panel and the backlight unit. The occurrence of rainbow spots was observed using a spectroradiometer (SR-3A, Topcon). No occurrence of rainbow spots was rated as X, a slight occurrence of rainbow spots was rated as Δ, a medium occurrence rainbow spots was rated as ○, and a severe occurrence of rainbow spots was rated as ⊙.

(2) UV blocking capability: The UV blocking capability of each of the polyethylene terephthalate films was evaluated by measuring transmittance at a wavelength of 370 nm using a spectrophotometer (V-550, Jasco Corporation), and was then evaluated as above after leaving the films at 85° C., as a condition for reliability. In both cases, when the measured UV transmittance was less than 2.0%, the UV blocking capability of the film was rated as "○", and, when the measured UV transmittance was higher than or equal to 2.0%, the UV blocking capability of the film was rated as "X".

(3) In-plane retardation: For each of the polyethylene terephthalate films, the initial in-plane retardation at a wavelength of 550 nm was measured using a retardation tester (Axoscan, AxoMetric Co., Ltd.), and the in-plane retardation after leaving the films at 85° C. for 1000 hours, as a measure of reliability, was measured as above. The variation rate in in-plane retardation was calculated according to Equation 1.

(4) Haze: For each of the polyethylene terephthalate films, the haze at a wavelength of 550 nm was measured using a haze meter (NDH-5000, DENSHOKU Co., Ltd.), and the haze after leaving the films at 85° C. for 1000 hours, as a condition for reliability, was measured as above. The variation rate in haze was calculated according to Equation 2.

(5) Transmittance: For each of the polyethylene terephthalate films, transmittance at a wavelength of 370 nm was measured using a transmittance meter (NDH-5000, DENSHOKU Co., Ltd.), and transmittance after UV irradiation at 120 W·sec/m² for 1000 hours, as a condition for reliability testing, was measured as above. The variation rate in transmittance was calculated according to Equation 3.

It should be understood that various modifications, changes, alterations, and equivalent embodiments can be made by those skilled in the art without departing from the spirit and scope of the present invention. Indeed, example embodiments have been disclosed and illustrated herein, and although specific terms may have been employed, they are used and are to be interpreted in a generic and descriptive sense only and not for purposes of limitation. In some instances, as would be apparent to those of ordinary skill in the art as of the filing of the present application, the features, characteristics, and/or elements described in connection with a particular embodiment may be used singly or in combination with features, characteristics, and/or elements described in connection with other embodiments unless specifically indicated otherwise. Accordingly, it will be understood by those of skill in the art that various changes in form and details may be made without departing from the spirit and scope of the present invention as set forth in the following claims.

What is claimed is:

1. A polarizing plate comprising a polarizer and a polyester film on at least one surface of the polarizer,
   wherein the polyester film comprises a polyester base film, and a primer layer on at least one surface of the polyester base film, and the polyester film contains about 0.1 wt % to about 5 wt % of a UV absorbent, and
   wherein the polyester film has:
   a variation rate in retardation of about 0% to about 5%, as calculated using Equation 1

Variation rate of retardation=$|B-A|/A \times 100$  (1)

wherein A is an initial retardation at a wavelength of 550 nm of the polyester film, and B is a retardation at a wavelength of 550 nm of the polyester film after being left at 85° C. for 1000 hours or after being left at 60° C./RH 95% for 1000 hours; and/or
   a variation rate in haze of about 0% to about 5%, as calculated using Equation 2:

Variation rate of haze=$|D-C|/C \times 100$  (2)

wherein C is an initial haze percentage at a wavelength of 550 nm of the polyester film, and D is a haze percentage at a wavelength of 550 nm of the polyester film after being left at 85° C. for 1000 hours; and/or
   a variation rate in transmittance of about 0% to about 5%, as calculated using Equation 3:

Variation rate of transmittance=$|F-E|/E \times 100$  (3)

wherein E is an initial transmittance percentage at a wavelength of 370 nm of the polyester film, and F is a transmittance percentage at a wavelength of 370 nm of the polyester film after being subjected to UV irradiation at 120 W·sec/m² for 1000 hours.

2. The polarizing plate according to claim 1, wherein the UV absorbent is contained in at least one of the polyester base film and the primer layer.

3. The polarizing plate according to claim 1, wherein the polyester film has an index of refraction of about 1.67 to about 1.75.

4. The polarizing plate according to claim 1, wherein the UV absorbent comprises at least one of a phenol, a benzotriazole, a salicylic acid, a benzophenone, a triazine, and/or a oxamide UV absorbent.

5. The polarizing plate according to claim 1, wherein the polyester film has an in-plane retardation (Ro) at a wavelength of 550 nm of about 5,000 nm to about 15,000 nm.

6. The polarizing plate according to claim 1, wherein the polyester film has a thickness direction retardation (Rth) at a wavelength of 550 nm of about 15,000 nm or less.

7. The polarizing plate according to claim 1, wherein the polyester film has the variation rate in retardation of about 0% to about 5%, as calculated using Equation 1:

Variation rate of retardation=$|B-A|/A \times 100$  (1)

wherein A is the initial retardation at a wavelength of 550 nm of the polyester film, and B is the retardation at a wavelength of 550 nm of the polyester film after being left at 85° C. for 1000 hours or after being left at 60° C./RH 95% for 1000 hours.

8. The polarizing plate according to claim 1, wherein the polyester film has the variation rate in haze of about 0% to about 5%, as calculated using Equation 2:

Variation rate of haze=$|D-C|/C \times 100$  (2)

wherein C is the initial haze percentage at a wavelength of 550 nm of the polyester film, and D is the haze percentage at a wavelength of 550 nm of the polyester film after being left at 85° C. for 1000 hours.

9. The polarizing plate according to claim 1, wherein the polyester film has the variation rate in transmittance of about 0% to about 5%, as calculated using Equation 3:

Variation rate of transmittance=$|F-E|/E \times 100$  (3)

wherein E is the initial transmittance percentage at a wavelength of 370 nm of the polyester film, and F is the transmittance percentage at a wavelength of 370 nm of the polyester film after being subjected to UV irradiation at 120 W·sec/m² for 1000 hours.

10. The polarizing plate according to claim 1, wherein the polyester film has an absolute value (|nx−ny|) of a difference between an index of refraction at a wavelength of 550 nm in an x-axis direction (nx) of the polyester film and an index of refraction at a wavelength of 550 nm in a y-axis direction (ny) of the polyester film of about 0.1 to about 0.2.

11. The polarizing plate according to claim 1, wherein the primer layer adjoins the polarizer.

12. The polarizing plate according to claim 1, further comprising: an optical film on another surface of the polarizer.

13. A liquid crystal display comprising the polarizing plate according to claim 1.

14. A method of fabricating a polarizing plate, comprising:
   preparing a multilayer film containing about 0.1 wt % to about 5 wt % of a UV absorbent;
   stretching the multilayer film to about 2 to about 10 times an initial length thereof in a transverse direction (TD) to prepare a polyester film; and
   attaching the polyester film to at least one surface of a polarizer,
   wherein the multilayer film comprises a polyester base film and a primer layer formed on at least one surface of the polyester base film, wherein the multilayer film has:
   a variation rate in retardation of about 0% to about 5%, as calculated using Equation 1

Variation rate of retardation=$|B-A|/A \times 100$  (1)

wherein A is an initial retardation at a wavelength of 550 nm of the multilayer film, and B is a retardation at a wavelength of 550 nm of the multilayer film after being left at 85° C. for 1000 hours or after being left at 60° C./RH 95% for 1000 hours; and/or
   a variation rate in haze of about 0% to about 5%, as calculated using Equation 2:

Variation rate of haze=$|D-C|/C \times 100$  (2)

wherein C is an initial haze percentage at a wavelength of 550 nm of the multilayer film, and D is a haze percentage at a wavelength of 550 nm of the multilayer film after being left at 85° C. for 1000 hours; and/or
   a variation rate in transmittance of about 0% to about 5%, as calculated using Equation 3:

Variation rate of transmittance=$|F-E|/E \times 100$  (3)

wherein E is an initial transmittance percentage at a wavelength of 370 nm of the multilayer film, and F is a transmittance percentage at a wavelength of 370 nm of the multilayer film after being subjected to UV irradiation at 120 W·sec/m² for 1000 hours.

15. The method according to claim 14, wherein the multilayer film is stretched only in the TD without machine direction (MD) stretching.

16. The method according to claim 14, further comprising: before attaching the polyester film to the polarizer, performing tension-relaxation to anneal the polyester film.

\* \* \* \* \*